US008296554B2

(12) United States Patent
Mirashrafi et al.

(10) Patent No.: US 8,296,554 B2
(45) Date of Patent: Oct. 23, 2012

(54) PRE-BOOT RECOVERY OF A LOCKED COMPUTER SYSTEM

(75) Inventors: Mojtaba Mirashrafi, Portland, OR (US); Mousumi Hazra, Beaverton, OR (US); Gyan Prakash, Beaverton, OR (US); Saurabh Dadu, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 773 days.

(21) Appl. No.: 12/346,078

(22) Filed: Dec. 30, 2008

(65) Prior Publication Data

US 2010/0169630 A1     Jul. 1, 2010

(51) Int. Cl.
| G06F 21/00 | (2006.01) |
| G06F 15/177 | (2006.01) |
| G06F 9/00 | (2006.01) |
| G06F 9/24 | (2006.01) |
| G06F 9/445 | (2006.01) |
| G06F 13/10 | (2006.01) |

(52) U.S. Cl. ............... 713/1; 713/2; 713/100; 713/168; 711/100; 711/115; 726/17; 726/18; 726/19; 726/21

(58) Field of Classification Search .................. 713/1, 2, 713/100, 150–152, 182–184; 711/100, 115, 711/E12.091, E12.092; 726/2, 17–19, 21
See application file for complete search history.

(56) References Cited

U.S. PATENT DOCUMENTS

| 6,654,890 B1 | 11/2003 | Girard |
| 2003/0028765 A1* | 2/2003 | Cromer et al. ............... 713/164 |
| 2004/0059907 A1 | 3/2004 | Cochran et al. |
| 2006/0294359 A1* | 12/2006 | Chou et al. ........................ 713/2 |
| 2007/0113267 A1* | 5/2007 | Iwanski et al. ..................... 726/2 |
| 2007/0223685 A1 | 9/2007 | Boubion et al. |
| 2008/0022124 A1* | 1/2008 | Zimmer et al. ............... 713/189 |
| 2008/0052507 A1 | 2/2008 | Chow et al. |

(Continued)

FOREIGN PATENT DOCUMENTS

EP     0 917 060 A1     5/1999

(Continued)

OTHER PUBLICATIONS

Office Action for KR Patent Application 10-2009-130996, mailed Mar. 28, 2011, 12 pages.

(Continued)

*Primary Examiner* — Fahmida Rahman
(74) *Attorney, Agent, or Firm* — Schwabe, Williamson & Wyatt, P.C.

(57) ABSTRACT

Embodiments of the present disclosure provide methods, apparatuses, articles, and removable storage devices for pre-boot recovery of a locked computer system. In one instance, the method includes determining on pre-boot whether a removable storage device is attached to a computer system, determining whether the computer system is in a locked state and, if the removable storage device is detected, transferring control to a pre-boot authentication module (PBA) stored on the removable storage device to interact with a manageability engine to restore the computer system from the locked state to an unlocked state. If the removable storage device is not detected, the computer system shuts down if the system is determined to be in the locked state and no other PBA is detected. The computer system comprises a host operating environment and a manageability engine that operates independent of the host operating environment. Other embodiments may also be described and claimed.

25 Claims, 3 Drawing Sheets

U.S. PATENT DOCUMENTS

2008/0155275 A1* 6/2008 Natarajan et al. .............. 713/193
2008/0263363 A1* 10/2008 Jueneman et al. ............ 713/184

FOREIGN PATENT DOCUMENTS

JP 2007-066123 A 3/2007

OTHER PUBLICATIONS

Office Action for CN Patent Application No. 200911000088.2, mailed Nov. 23, 2011, 11 pages.
Office Action for JP Patent Application No. 2009-292868, mailed Feb. 21, 2012, 7 pages.

* cited by examiner

PRE-BOOT RECOVERY OF A LOCKED COMPUTER SYSTEM

TECHNICAL FIELD

Embodiments of the present disclosure relate to the fields of computing systems, and, more specifically, to recovery or unlocking of a locked computer system.

BACKGROUND

Security arrangements that lock or otherwise disable electronic devices are emerging as a solution to protect loss of data and other assets from loss or theft of computing assets. Electronic devices such as computer systems, for example, may implement an anti-theft technology that locks the computer system when the computer system is identified as lost or stolen.

One of the challenges in such anti-theft technology is to provide recovery from a locked state. Corruption of hardware, firmware, or software may, for example, prevent a locally stored recovery module from operating to recover the locked computer system.

BRIEF DESCRIPTION OF THE DRAWINGS

Embodiments of the present disclosure will be readily understood by the following detailed description in conjunction with the accompanying drawings and appended claims. Embodiments of the disclosure are illustrated by way of example and not by way of limitation in the figures of the accompanying drawings.

DETAILED DESCRIPTION OF EMBODIMENTS

In the following detailed description, reference is made to the accompanying drawings which form a part hereof, and in which are shown by way of illustration embodiments in which the disclosure may be practiced. It is to be understood that other embodiments may be utilized and structural or logical changes may be made without departing from the scope of the present disclosure. Therefore, the following detailed description is not to be taken in a limiting sense, and the scope of embodiments in accordance with the present disclosure is defined by the appended claims and their equivalents.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Figure 1:
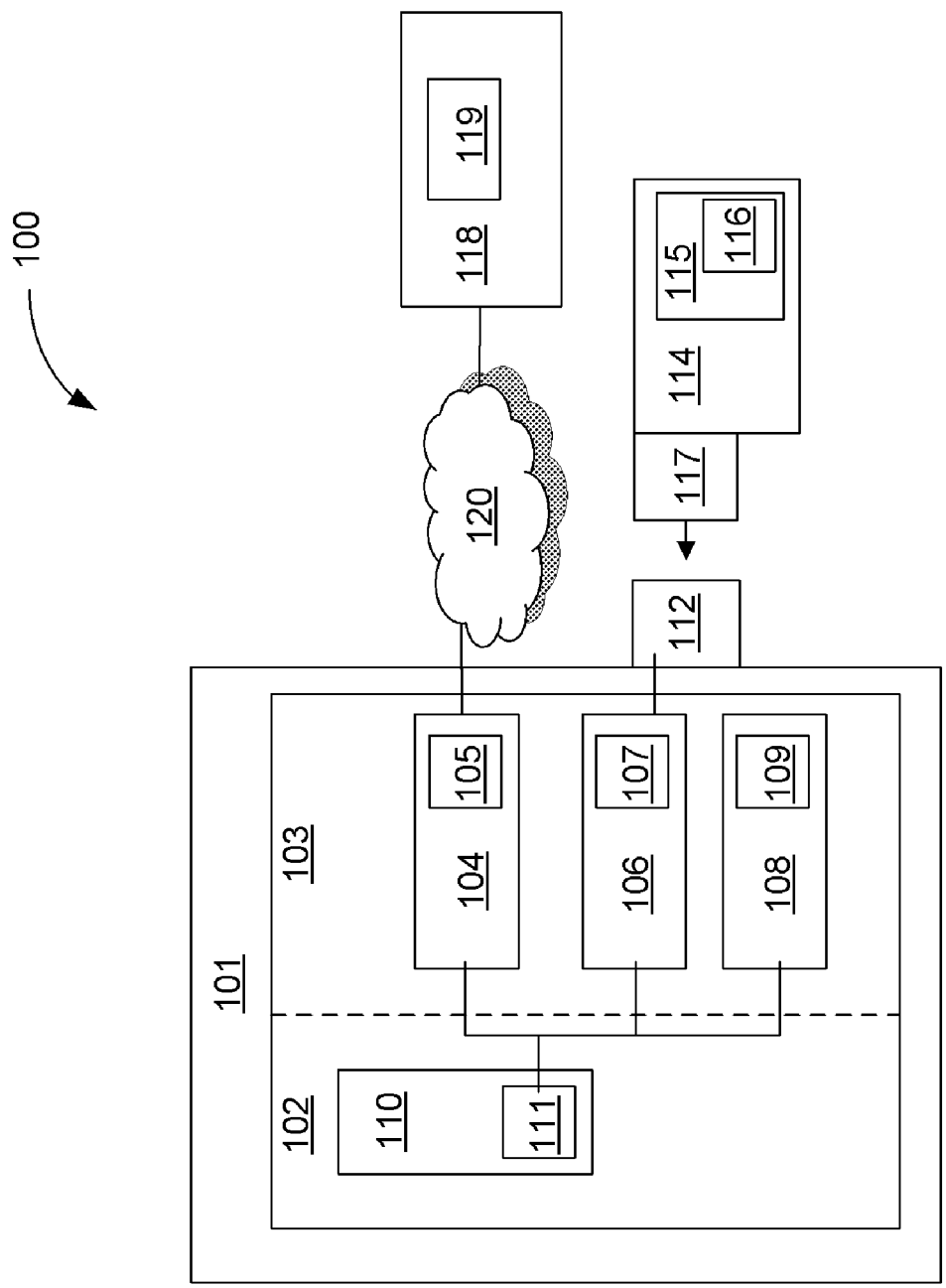
FIG. 1 is a schematic diagram of a system for recovery of a locked electronic device, in accordance with various embodiments.

In various embodiments of the present disclosure, methods, apparatuses, articles, and removable storage devices for recovery of a locked security system are disclosed. FIG. 1 is a schematic diagram of a system for recovery of a locked electronic device, in accordance with various embodiments. In an embodiment, system 100 includes an electronic device 101 having a manageability engine (ME) 102, central processing unit (CPU) environment 103, host operating environment 104, host module 105, basic input/output system (BIOS) 106, BIOS module 107, local pre-boot authentication (PBA) environment 108, local PBA module 109, ME environment 110, ME module 111, and peripheral interface 112, coupled as shown. System 100 may further removably include a removable storage device 114 having non-volatile storage 115, pre-boot authentication (PBA) module 116, and peripheral interface 117, coupled as shown. System 100 may still further include a server 118 having a server module 119, the server being coupled with the electronic device 101 by network 120.

Electronic device 101 may be a host device, a computer system, an apparatus, an article of manufacture, or a digital device, or combinations thereof, according to various embodiments. Other embodiments of electronic device 101 may be further described with respect to FIG. 2.

For the embodiments, as alluded to earlier, electronic device 101 includes ME 102 and CPU environment 103. ME 102 may comprise an environment 110 that includes a variety of modules having various functionalities, including an ME module 111 to perform or manage operations, including in particular, operations related to anti-theft or security functions of electronic device 101. ME 102 may be implemented, operated, or run by a processor of electronic device 101. The ME 102 may include, for example, instructions stored as firmware or software to be executed by a processor independent of a CPU that implements, operates, or runs the CPU environment 103. In an embodiment, the ME 102 is run by an embedded processor that is not the CPU. In other embodiments, the ME 102 may be configured to be run by a CPU. The ME 102 may be coupled to the host operating environment 104, but configured to operate independent of the host operating environment 104, as indicated by the dashed line. For example, host environment 104, BIOS 106, and PBA module 108 may be run by the CPU that runs the CPU environment 103 and the ME module 111 to perform security authentication and related functions may be run by a separate processor that runs the ME 102.

The ME 102 may be equipped to disable electronic device 101 on detection of a condition, and to re-enable the electronic device 101 on authentication. In an embodiment, the ME 102 is configured to restore electronic device 101 from a locked state to an unlocked state, on authentication. According to an embodiment, the ME 102 is configured to recover and return electronic device 101 to a normal operating state from a stolen state, on authentication. In another embodiment, the ME 102 of the electronic device 101 is configured to restore the electronic device 101 to an unprotected state from a protected state, on authentication.

The terms "disabled", "locked", "stolen", and "protected" may be used interchangeably to refer to a more secure mode of operation of the electronic device 101. In an embodiment, a disabled, locked, stolen, or protected state refers to a state wherein anti-theft technology holds the boot of the electronic device 101 in a pre-boot phase and does not allow boot to unauthenticated devices. Electronic device 101 may be locked by a chipset or other platform having functionality to generally prevent booting a suspected stolen electronic device 101 beyond BIOS 106 operation. One or more events such as a reported loss or theft of electronic device 101 may trigger the more secure mode of operation. For example, a user may report a theft or loss to an administrator or system that manages anti-theft reports, which may send a command to ME 102 via network 120 to place the electronic device 101 in the locked state. Electronic device 101 may be identified as lost or stolen by local or remote means. Subject matter is not limited in this regard and other conditions or events may trigger the more secure mode of operation in other embodiments.

ME 102 may be configured to authenticate credentials via local PBA module 109 or removable PBA module 116 to restore the electronic device 101 from the disabled state to the re-enabled state. The ME 102 may require secure credentials, such as a public or private key, for the PBA modules 109,116 to communicate with the ME 102. Secure credentials may be provided, for example, by server 118 communicating with ME 102 via network 120. According to various embodiments, ME 102 may include various embedded processors or other secure execution environments in an anti-theft platform.

CPU environment 103 may include one or more environments 104,106, 108 that are implemented by a CPU of the electronic device 101. The CPU that operates CPU environment 103 may be configured to run the host operating environment 104 and the BIOS 106 in an embodiment. The CPU that operates CPU environment 103 and the embedded processor that operates the ME 102 may be described further with respect to electronic device 200 of FIG. 2.

The host operating environment 104 may include an operating system (OS) of the electronic device 101. In an embodiment, host operating environment 104 includes a host module 105 to manage anti-theft or other security functionality and to interact over a network 120 with a server 118 having a server module 119 to manage anti-theft or other security functionality. In an embodiment, host module 105 interacts with server module 119 to manage functions that include, for example, theft detection, policy enforcement, server rendezvous and/or key management. For example, host module 105 may relay information related to theft detection, policy enforcement, server rendezvous and/or key management from server 118 to ME 102. Network 120 may include any suitable network including wireless, local area network (LAN), or internet. Subject matter is not limited in this regard and may include a variety of other network types in other embodiments.

Electronic device 101 may include a peripheral interface 112. In an embodiment, peripheral interface 112 is configured to enable a removable storage device 114 to be attached to the electronic device 101. Peripheral interface 112 may include, for example, a universal serial bus (USB) interface according to one embodiment. Subject matter is not limited in this regard and other types of peripheral interface 112 may be used in other embodiments.

CPU environment 103 may further include BIOS 106. In an embodiment, BIOS 106 is operatively coupled to the host operating environment 104, the ME 102, and the peripheral interface 112. BIOS 106 may include various modules for performing pre-boot operations, and below operating system level operations. For the embodiments, BIOS 106 may include an authentication module 107 that engages if the electronic device 101 is in a disabled, locked, stolen, or protected state to aid in recovery from the disabled state or to recover data stored on the electronic device 101, or combinations thereof.

BIOS 106 may be configured to determine whether electronic device 101 is in a disabled, locked, stolen, or protected state by, for example, querying the ME 102 for the state. If the electronic device is in the disabled, locked, stolen, or protected state, BIOS 106 may be configured to transfer control to local PBA module 109 or removable PBA module 116 to provide authentication and recovery. BIOS 106 may be referred to as "pre-boot firmware" herein, in one or more embodiments.

According to various embodiments, BIOS 106 is configured to determine, on pre-boot, whether a removable storage device 114 is attached to the electronic device 101. BIOS 106 may be further configured to transfer control, on detection of the removable storage device 114, to a PBA module 116 stored on the removable storage device 114 to interact with the ME 102 to restore the electronic device 101 from a disabled state to a re-enabled state, as opposed to interacting with local authentication module 107.

In an embodiment, BIOS 106 is configured to determine, during pre-boot, whether the removable storage device 114 is attached to electronic device 101, and if detected, to boot the electronic device 101 from a bootable environment of the removable storage device 114, as opposed to booting from a bootable environment of device 101. If the BIOS 106 does not detect the removable storage device 114, the BIOS 106 may be configured to engage local PBA module 109 to perform pre-boot authentication functions.

Local PBA module 109 or removable PBA module 116 may be configured to perform various pre-boot authentication functions. In an embodiment, PBA modules 109,116 are configured to determine whether electronic device 101 is in a disabled, locked, stolen, or protected state by, for example, querying the ME 102 for the state. In an embodiment, PBA modules 109,116 comprise the secure credentials, such as a public or private key, to communicate with the ME 102. PBA modules 109,116 may be configured to prompt a user to provide authentication credentials to the ME 102 on determining that the electronic device 101 is in a disabled, locked, stolen, or protected state. Authentication credentials may include, for example, a user pass phrase or a server-generated pass phrase. Subject matter is not limited in this regard and other types of authentication credentials may be used in other embodiments.

On determining that electronic device 101 is not in a disabled, locked, stolen, or protected state, PBA modules 109, 116 may be configured to prompt a user to logon to host operating environment 104. Host operating environment 104 may be booted if pre-boot authentication functions of PBA modules 109, 116 complete successfully.

Local PBA module 109 may be operatively coupled with the BIOS 106, the host environment 104, and the ME 102, to interact with the ME 102 to restore the electronic device 101 from the disabled state to the re-enabled state. Local PBA module 109 may not operate due to a variety of conditions including but not limited to corruption of a storage device that stores the local PBA module 109. In such case, PBA module 116 of removable storage device 114 may be implemented to restore, recover, or re-enable the disabled electronic device 101.

BIOS 106 may be configured to determine whether the electronic device 101 is disabled by the ME 102. In an embodiment, BIOS 106 is configured to shut down the electronic device 101 when the electronic device 101 is in a disabled state 102 and no PBA module 109, 116 is detected by the BIOS 106. No PBA module 109, 116 may be detected when, for example, PBA module 109 is corrupt and removable storage device 114 having PBA module 116 is not attached to the electronic device 101. Shutting down the electronic device 101 may include turning off power to the electronic device 101, but is not limited in this regard. In an embodiment, BIOS 106 is configured to shut down the electronic device 101 if no valid authentication credentials have been provided within an allotted time.

System 100 may further removably include a removable storage device 114 having non-volatile storage 115, PBA module 116, and a peripheral interface 117. Non-volatile storage 115 may comprise a variety of non-volatiles storage devices including, for example, flash memory. According to various embodiments, removable storage device 114 may comprise other types of non-volatile storage 115 including, for example, magnetic storage drives. Subject matter is not limited in this regard and removable storage device 114 may include a variety of other types of non-volatile storage 115 in other embodiments.

Peripheral interface 117 of removable storage device 114 may include a variety of types of interfaces. In one embodiment, peripheral interface 117 includes a USB interface, but is not limited in this regard. Peripheral interface 117 of removable storage device 114 may be configured to couple to peripheral interface 112 of electronic device 101 as indicated by the arrow next to peripheral interface 117.

PBA module 116 may be stored in the non-volatile storage 115. In an embodiment, PBA module 116 is configured to transfer control from pre-boot firmware (BIOS) 106 of the electronic device 101, when the pre-boot firmware 106 detects, on pre-boot, attachment of the removable storage device 114 to the electronic device 101. PBA module 116 may be further configured to interact with ME 102 of the electronic device 101 to restore the electronic device to an unprotected state from a protected state.

Removable storage device 114 may comprise a bootable environment such that electronic device 101 may boot from the removable storage device 114. Removable storage device 114 may comprise a software kernel, for example, that provides a run time environment for pre-boot authentication. In an embodiment, removable storage device 114 comprises one of many types of flash drives including, for example, a thumb drive, pen drive, or other similar drive. Subject matter is not limited in this regard and removable storage device 114 may comprise other devices including, for example, magnetic storage drives, or other devices in other embodiments.

According to various embodiments, removable storage device 114 may be portable or mobile. Removable storage device 114 may be a sole device for an enterprise that owns or uses the electronic device 101 to increase security. Removable storage device 114 may be attached to the electronic device 101 in a secure area designated by the enterprise. Authentication credentials to restore the electronic device 101 from a disabled state to a re-enabled state may be provided by an information technology administrator and may include verifying a user's identity prior to providing the authentication credentials. Subject matter is not limited in this regard and other strategies may be implemented to safeguard recovery of the electronic system 101.

Figure 2:
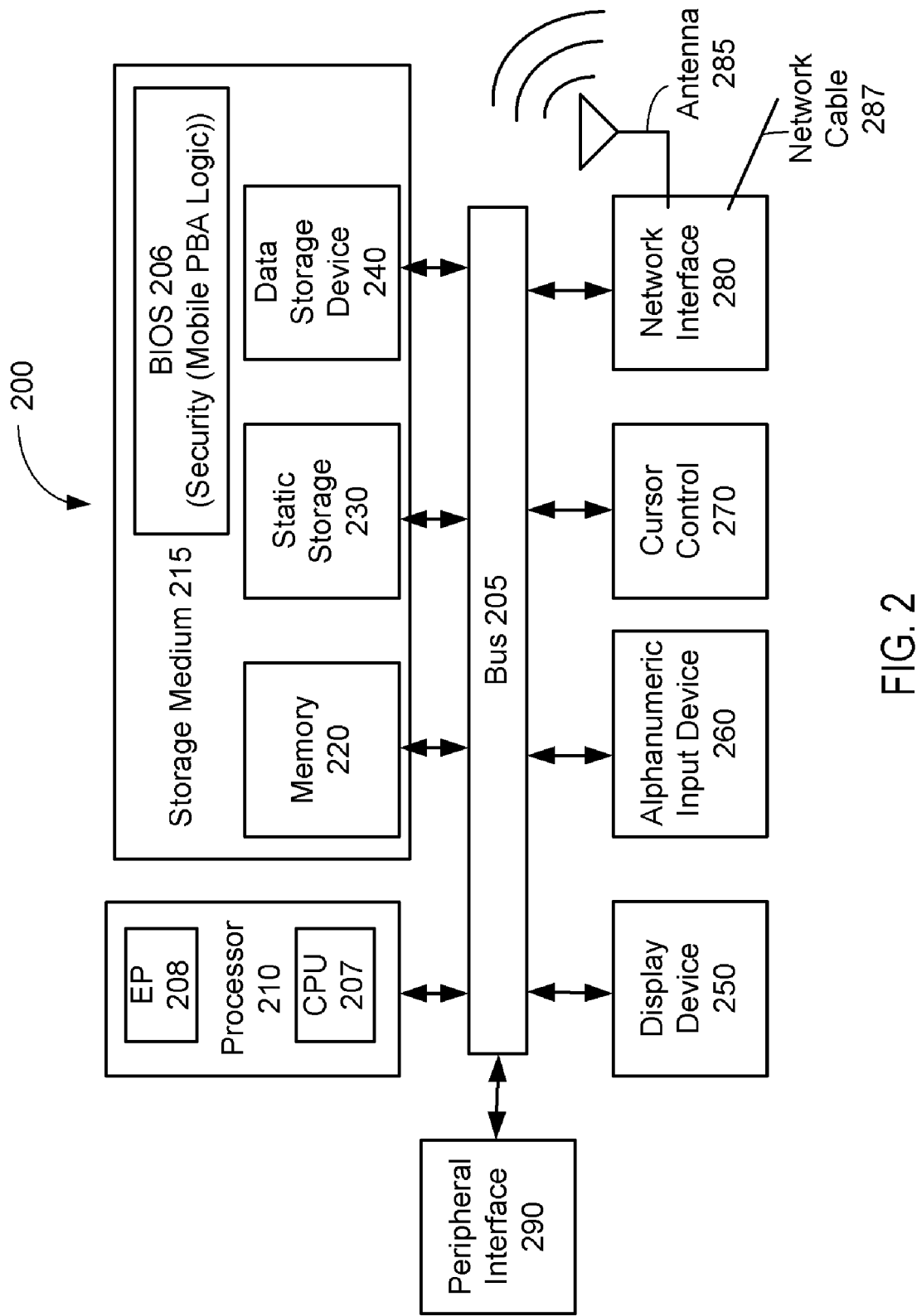
FIG. 2 is a schematic diagram of an electronic device, in accordance with various embodiments.

FIG. 2 is a schematic diagram of an electronic, in accordance with various embodiments. Electronic device 200 may accord with embodiments already described with respect to electronic device 101. Electronic device 200 may further describe electronic device 101. In an embodiment, electronic device 200 is intended to represent a range of electronic devices (either wired or wireless). In an embodiment, electronic device 200 represents a variety of devices including, for example, desktop computer devices, laptop computer devices, personal computers (PC), wireless telephones, personal digital assistants (PDA) including cellular-enabled PDAs, set top boxes, pocket PCs, tablet PCs, DVD players, or servers, but is not limited to these examples and may include other electronic devices. Alternative electronic devices may include more, fewer and/or different components. Electronic device 200 may be a host device, a computer system, an apparatus, an article of manufacture, or a digital device, or combinations thereof, according to various embodiments.

In one embodiment, electronic device 200 includes features of electronic device 100 as described and depicted with respect to FIG. 1. Electronic device 200 may include bus 205 or other communication device or interface to communicate information, and processor 210 coupled to bus 205 that may process information. Bus 205 may be a single system bus or a number of buses of the same or different types bridged together. Device 200 may include one or more processors and/or co-processors. In an embodiment, device 200 includes a central processing unit (CPU) 207 configured to run a host operating environment 104, BIOS 106, or local PBA environment 108, or combinations thereof. Device 200 may further include another processor, such as an embedded processor (EP) 208 configured to run a manageability engine (ME) 102. According to various embodiments, CPU 207 implements, runs, or operates CPU environment 102 and embedded processor 208 implements, runs, or operates ME 102. Electronic device 200 may include more or less processors than depicted.

Device 200 may also include a storage medium 215, which may include various types of storage, coupled to bus 205 to store information and instructions that may be processed or executed by processors 207, 208, 210. Storage medium 215 may include more or less types of storage than depicted according to various embodiments. In an embodiment, instructions to implement BIOS 206 (incorporated with the teachings of the present disclosure earlier described) and the ME 102 are stored in storage medium 215. The instructions may be in the form of firmware or software according to various embodiments.

In an embodiment, device 200 includes random access memory (RAM) or other storage device 220 (may be referred to as "memory"), coupled to bus 205. Memory 220 may also be used to store temporary variables or other intermediate information during execution of instructions by processors 207, 208, 210. Memory 220 is a flash memory device in one embodiment. In an embodiment, instructions to implement BIOS 206 or the ME 102, or combinations thereof, are stored in memory 220.

Device 200 may also include read only memory (ROM) and/or other static storage device 230 coupled to bus 205 that may store static information and instructions for processors 207, 208, 210. In an embodiment, instructions to implement BIOS 206 or the ME 102, or combinations thereof, are stored in static storage 230. Data storage device 240 may be coupled to bus 205 to store information and instructions. Data storage device 240 such as a magnetic disk or optical disc and corresponding drive may be coupled with electronic device 200. In an embodiment, instructions to implement local PBA module 109 are stored in data storage device 240. In an embodiment, instructions to implement BIOS 206 or the ME 102, or combinations thereof, are stored in data storage device 240.

In an embodiment, electronic device 200 includes an article of manufacture having a storage medium 215 and a plurality of instructions stored in the storage medium 215 configured to implement a BIOS 106 for electronic device 200 having a host operating environment 104 and a ME 102 that operates independent of the host operating environment 104. The storage medium 215 may further comprise another plurality of instructions stored in the storage medium 215 configured to implement the ME 102, wherein the ME 102 is configured to authenticate credentials to recover and return electronic device 200 to a normal operating state from a stolen state.

Electronic device 200 may also be coupled via bus 205 to display device 250, such as a cathode ray tube (CRT) or liquid crystal display (LCD), to display information to a user. Alphanumeric input device 260, including alphanumeric and other keys, may be coupled to bus 205 to communicate information and command selections to processor 210. Cursor control 270 may be another type of input device and may include, for example, a mouse, a trackball, or cursor direction keys to communicate information and command selections to processor 210 and to control cursor movement on display 250.

Electronic device 200 may further include one or more network interfaces 280 to provide access to network 120, such as a local area network, but is not limited in this regard. Network interface 280 may include, for example, a wireless network interface having antenna 285, which may represent one or more antennae. Network interface 280 may also include, for example, a wired network interface to communicate with remote devices via network cable 287, which may be, for example, an Ethernet cable, a coaxial cable, a fiber optic cable, a serial cable, or a parallel cable.

In one embodiment, network interface 280 may provide access to a local area network, for example, by conforming to an Institute of Electrical and Electronics Engineers (IEEE) standard such as IEEE 802.11b and/or IEEE 802.11g standards, and/or the wireless network interface may provide access to a personal area network, for example, by conforming to Bluetooth standards. Other wireless network interfaces and/or protocols can also be supported.

IEEE 802.11b corresponds to IEEE Std. 802.11b-1999 entitled "Local and Metropolitan Area Networks, Part 11: Wireless LAN Medium Access Control (MAC) and Physical Layer (PHY) Specifications: Higher-Speed Physical Layer Extension in the 2.4 GHz Band," approved Sep. 16, 1999 as well as related documents. IEEE 802.11g corresponds to IEEE Std. 802.11g-2003 entitled "Local and Metropolitan Area Networks, Part 11: Wireless LAN Medium Access Control (MAC) and Physical Layer (PHY) Specifications, Amendment 4: Further Higher Rate Extension in the 2.4 GHz Band," approved Jun. 27, 2003 as well as related documents. Bluetooth protocols are described in "Specification of the Bluetooth System: Core, Version 1.1," published Feb. 22, 2001 by the Bluetooth Special Interest Group, Inc. Previous or subsequent versions of the Bluetooth standard may also be supported.

In addition to, or instead of, communication via wireless LAN standards, network interface(s) 280 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

Electronic Device 200 may further include a peripheral interface 290 that may accord with embodiments described with respect to peripheral interface 112. Peripheral interface 290 may be configured to enable a removable storage device 114 to be attached to the electronic device 200. In an embodiment, electronic device 200 includes an article of manufacture having a storage medium 215 and a plurality of instructions stored on the storage medium 215 to implement a BIOS 106 configured to detect, on pre-boot, whether a removable storage device 114 is attached to electronic device 200 via peripheral interface 290, and to transfer control, on detection, to a PBA module 116 stored on the removable storage device 114 to interact with ME 102 to recover and return electronic device 200 to a normal operating state from a stolen state.

Figure 3:
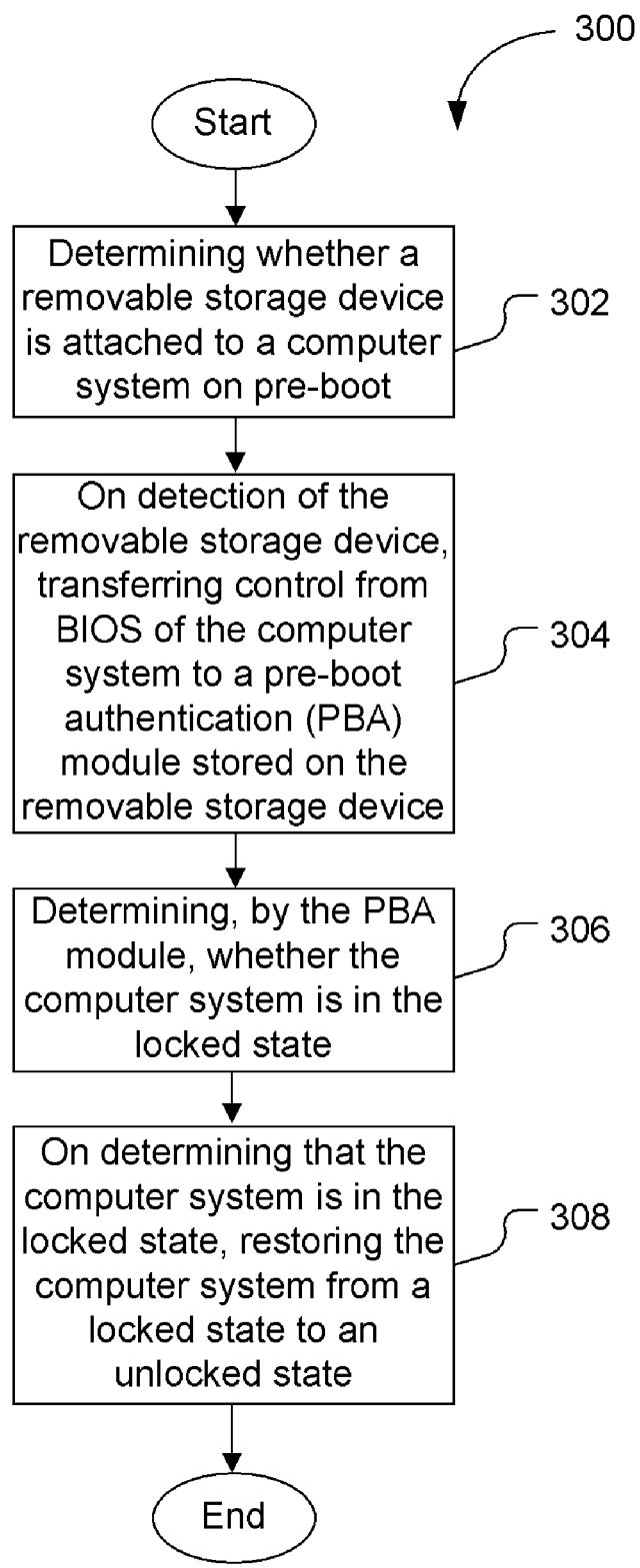
FIG. 3 is a flow diagram of a method for recovery of a locked electronic device, in accordance with various embodiments.

FIG. 3 is a flow diagram of a method for recovery of a locked electronic device, in accordance with various embodiments. In an embodiment, method 300 includes determining whether a removable storage device is attached to a computer system on pre-boot at block 302, on detection of the removable storage device, transferring control from BIOS of the computer system to a pre-boot authentication (PBA) module stored on the removable storage device at block 304, determining, by the PBA module, whether the computer system is in the locked state at block 306, and on determining that the computer system is in the locked state, restoring the computer system from a locked state to an unlocked state at block 308. Although the term "computer system" is used to describe aspects of method 300, actions of method 300 may likewise operate for an electronic device, a host device, an apparatus, an article of manufacture, or a digital device, and may not be limited in this regard. Method 300 may include various actions or operations already described with respect to FIG. 1 and FIG. 2.

Method 300 may include determining, by a BIOS of a computer system, on pre-boot, whether a removable storage device is attached to the computer system 302. The computer system may include a host operating environment and a manageability engine (ME) that operates independent of the host operating environment. Method 300 may include querying the ME for a state of the computer system on pre-boot.

Method 300 may further include, on detection of the removable storage device, transferring control, by the BIOS, to a PBA module stored on the removable storage device 304 to interact with the ME to restore the computer system from a locked state to an unlocked state. In an embodiment, the BIOS transferring control to the PBA module 304 includes booting the computer system from a bootable environment stored on the removable storage device.

In an embodiment, method 300 further includes, on detection of the removable storage device, determining, by the PBA module, whether the computer system is in the locked state 306. The PBA module may, for example, query the ME to determine a locked or unlocked state of the computer system. The ME may require secure credentials, such as a public or private key, to communicate with the ME. In an embodiment, the PBA module has the secure credentials, such as a public or private key, to communicate with the ME.

Method 300 may further include restoring the computer system from the locked state to the unlocked state on determining that the computer system is in the locked state 308. Restoring the computer system from the locked state to the unlocked state 308 may include prompting a user to provide authentication credentials to the ME via the PBA module. Authentication credentials may include, for example, a server-generated pass phrase or user pass phrase, but is not limited in this regard.

In various embodiments, method 300 may further include determining, by the BIOS, on pre-boot, whether the computer system is in the locked state. The BIOS may, for example, query the ME to determine a locked or unlocked state of the computer system. The BIOS may shut down the computer system if the BIOS determines that the computer system is in the locked state and the BIOS detects no PBA module to restore the computer system from the locked state to the unlocked state. No PBA module may be detected if, for example, a local PBA module fails to operate correctly due to corruption or some other event and no remote storage device having a PBA module is attached to the computer system. In an embodiment, the BIOS may shut down the computer system if valid authentication credentials are not provided within an allotted time or the BIOS does not detect a PBA module when the computer system is locked within an allotted time, or combinations thereof.

Various operations may have been described as multiple discrete operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope of the present disclosure. Those with skill in the art will readily appreciate that embodiments in accordance with the present disclosure may be implemented in a very wide variety of ways. This application is intended to cover any adaptations or variations of the embodiments discussed herein. Therefore, it is manifestly intended that embodiments in accordance with the present disclosure be limited only by the claims and the equivalents thereof.

What is claimed is:

1. A method comprising:
   determining, by a basic input/output system (BIOS) of a computer system, on pre-boot, whether a removable storage device is attached to the computer system, wherein the computer system comprises a host operating environment and a manageability engine (ME) that operates independent of the host operating environment to recover the computer system on authentication;
   determining, by the BIOS, whether the computer system is in a locked state;
   if the removable storage device is detected, transferring, by the BIOS, control to a pre-boot authentication (PBA) module stored on the removable storage device to interact with the ME to restore the computer system from the locked state to an unlocked state; and
   if the removable storage device is not detected, shutting down the computer system by the BIOS if the computer system is determined by the BIOS to be in the locked state by querying the ME and no other PBA module to restore the computer system from the locked state to the unlocked state is detected by the BIOS.

2. The method of claim 1, further comprising:
   determining, by the PBA module, upon being transferred control, whether the computer system is in the locked state.

3. The method of claim 2, further comprising:
   on determining that the computer system is in the locked state, restoring, by the ME and the PBA module, the computer system from the locked state to the unlocked state.

4. The method of claim 3, wherein restoring the computer system from the locked state to the unlocked state comprises:
   prompting a user to provide authentication credentials to the ME via the PBA module.

5. The method of claim 4, wherein the ME requires a public or private key for communication and wherein the PBA module comprises the public key or the private key to communicate with the ME.

6. The method of claim 4, wherein prompting the user to provide the authentication credentials comprises:
   prompting the user for a server-generated pass phrase to restore the computer system from the locked state to the unlocked state.

7. The method of claim 1, wherein the BIOS transferring control to the PBA module stored on the removable storage device further comprises the BIOS booting the computer system from a bootable environment stored on the removable storage device.

8. An apparatus comprising:
   a host operating environment;
   a manageability engine (ME) coupled to the host operating environment, but configured to operate independent of the host operating environment, the ME equipped to disable the apparatus on detection of a condition, and to re-enable the apparatus on authentication;
   a peripheral interface configured to enable a removable storage device to be attached to the apparatus; and
   a basic input/output system (BIOS) operatively coupled to the host operating environment, the ME, and the peripheral interface, and configured to determine, on pre-boot, whether a removable storage device is attached to the peripheral interface, to transfer control, on detection of a removable storage device attached to the peripheral interface, to a pre-boot authentication (PBA) module stored on the removable storage device to interact with the ME to restore the apparatus from a disabled state to a re-enabled state, and to shut clown the apparatus when the apparatus is disabled by the ME and no PBA module is detected by the BIOS.

9. The apparatus of claim 8, wherein the peripheral interface comprises a universal serial bus (USB).

10. The apparatus of claim 8, further comprising:
    a central processing unit (CPU) configured to run the host operating environment and the BIOS; and
    an embedded processor configured to run the ME.

11. The apparatus of claim 8, further comprising:
    another pre-boot authentication (PBA) module locally disposed on the apparatus and operatively coupled with the BIOS, the host environment, and the ME, to interact with the ME to restore the apparatus from the disabled state to the re-enabled state.

12. The apparatus of claim 8, wherein the BIOS is further configured to determine whether the apparatus is disabled by the ME.

13. The apparatus of claim 8, wherein the BIOS is further configured to boot the apparatus from a bootable environment of the removable storage device.

14. The apparatus of claim 8, wherein the ME is configured to authenticate credentials via the PBA module to restore the apparatus from the disabled state to the re-enabled state.

15. The apparatus of claim 8, wherein the PBA module is configured to prompt a user to provide authentication credentials to the ME to restore the apparatus from the disabled state to the re-enabled state.

16. The apparatus of claim 8, wherein the ME requires a public key or private key for communication and wherein the PBA module comprises the public key or the private key to communicate with the ME.

17. An article of manufacture comprising:
a non-transitory computer-readable storage medium; and
a plurality of instructions stored in the storage medium configured to implement a basic input/output system (BIOS) for a digital device having a host operating environment and a manageability engine (ME) that operates independent of the host operating environment, the BIOS configured to detect, on pre-boot, whether a removable storage device is attached to the digital device, and to transfer control, on detection, to a pre-boot authentication (PBA) module stored on the removable storage device to interact with the ME to recover and return the digital device to a normal operating state from a stolen state, wherein the BIOS is further configured to determine whether the digital device is in the stolen state by querying the ME and to shut down the digital device if the digital device is in the stolen state and no PBA module is detected by the BIOS,
wherein the ME is configured to authenticate credentials via the PBA module to recover and return the digital device to the normal operating state from the stolen state.

18. The article of manufacture of claim 17, wherein the storage medium comprises non-volatile memory.

19. The article of manufacture of claim 17, further comprising another plurality of instructions stored in the storage medium configured to implement the ME.

20. The article of manufacture of claim 17, wherein the BIOS is further configured to boot the digital device from a bootable environment of the removable storage device.

21. A removable storage device comprising:
a peripheral interface to attach the removable storage device to an electronic device, the electronic device including a central processing unit (CPU) configured to run a host operating environment and a pre-boot firmware and an embedded processor, other than the CPU, configured to run a manageability engine (ME);
non-volatile storage coupled to the peripheral interface; and
a pre-boot authentication (PBA) module stored in the non-volatile storage, configured to transfer control from the pre-boot firmware of the electronic device, when the pre-boot firmware detects, on pre-boot, attachment of the removable storage device to the electronic device, and to interact with the ME of the electronic device to restore the electronic device to an unprotected state from a protected state, wherein the pre-boot firmware is configured to determine whether the electronic device is in the protected state by querying the ME and to shut down the electronic device if the electronic device is in the protected state and no PBA module is detected by the pre-boot firmware.

22. The removable storage device of claim 21, wherein the peripheral interface comprises a universal serial bus (USB) and wherein the non-volatile storage comprises flash memory.

23. The removable storage device of claim 21, wherein the PBA module is configured to prompt a user to provide authentication credentials to the ME to restore the electronic device from the protected state to the unprotected state.

24. The removable storage device of claim 21, wherein the ME requires a public key or private key for communication and wherein the PBA module comprises the public key or the private key to communicate with the ME.

25. The removable storage device of claim 21, wherein the pre-boot firmware is configured to hoot the electronic device from a bootable environment of the removable storage device.

* * * * *